(12) United States Patent
Tu et al.

(10) Patent No.: US 9,058,827 B1
(45) Date of Patent: Jun. 16, 2015

(54) DISK DRIVE OPTIMIZING FILTERS BASED ON SENSOR SIGNAL AND DISTURBANCE SIGNAL FOR ADAPTIVE FEED-FORWARD COMPENSATION

(71) Applicant: Western Digital Technologies, Inc., Irvine, CA (US)

(72) Inventors: Kuang-Yang Tu, Irvine, CA (US); Wei Xi, Mission Viejo, CA (US); Jianguo Zhou, Foothill Ranch, CA (US); Teddy T. Chen, Laguna Woods, CA (US)

(73) Assignee: Western Digitial Technologies, Inc., Irvine, CA (US)

( * ) Notice: Subject to any disclaimer, the term of this patent is extended or adjusted under 35 U.S.C. 154(b) by 0 days.

(21) Appl. No.: 13/927,096

(22) Filed: Jun. 25, 2013

(51) Int. Cl.
    G11B 5/596     (2006.01)
    G11B 5/58      (2006.01)

(52) U.S. Cl.
    CPC ........................................ *G11B 5/58* (2013.01)

(58) Field of Classification Search
    None
    See application file for complete search history.

(56) References Cited

U.S. PATENT DOCUMENTS

| | | | |
|---|---|---|---|
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,275,592 B1 | 8/2001 | Vartiainen | |
| 6,281,652 B1 | 8/2001 | Ryan et al. | |
| 6,285,521 B1 | 9/2001 | Hussein | |
| 6,292,320 B1 | 9/2001 | Mason et al. | |

(Continued)

OTHER PUBLICATIONS

Widrow, B., et al. "Adaptive noise cancelling: Principles and applications," Proceedings of the IEEE 63 (12), 1692-1716, 1975.

(Continued)

*Primary Examiner* — K. Wong

(57) ABSTRACT

A disk drive is disclosed comprising a servo control system operable to actuate a head over a disk. A sensor signal is filtered with a first filter comprising a frequency response, and the filtered sensor signal is filtered to generate a compensated sensor signal. An error signal is filtered with a second filter comprising the frequency response, and an adaptation control signal is generated based on the compensated sensor signal and the filtered error signal. An adaptive filter is adapted in response to the adaptation control signal, wherein the adaptive filter filters the sensor signal to generate feed-forward compensation values. The feed-forward compensation values are applied to the servo control system to compensate for the disturbance. A disturbance signal that represents the disturbance is generated, and the frequency response of the first and second filters is optimized based on the sensor signal and the disturbance signal.

26 Claims, 4 Drawing Sheets

(56) References Cited

U.S. PATENT DOCUMENTS

| | | | |
|---|---|---|---|
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,674,600 B1 | 1/2004 | Codilian et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,318 B1 | 10/2005 | Ngo |
| 6,952,322 B1 | 10/2005 | Codilian et al. |
| 6,954,324 B1 | 10/2005 | Tu et al. |
| 6,958,881 B1 | 10/2005 | Codilian et al. |
| 6,958,882 B2 * | 10/2005 | Kisaka | 360/78.04 |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,375,916 B2 * | 5/2008 | Semba et al. | 360/77.04 |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |

(56) References Cited

U.S. PATENT DOCUMENTS

| | | | |
|---|---|---|---|
| 7,468,855 B1 | 12/2008 | Weerasooriya et al. |
| 7,471,483 B1 | 12/2008 | Ferris et al. |
| 7,477,471 B1 | 1/2009 | Nemshick et al. |
| 7,480,116 B1 | 1/2009 | Bennett |
| 7,486,470 B1 | 2/2009 | Semba |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,529,057 B1 | 5/2009 | Sutardja |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,561,365 B2 | 7/2009 | Noguchi et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,633,704 B2 | 12/2009 | Supino et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,777,982 B2 | 8/2010 | Kim et al. |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,027,119 B2 | 9/2011 | Zhang |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,797,673 B2 | 8/2014 | Supino |
| 2002/0153451 A1 | 10/2002 | Kiss et al. |
| 2004/0213100 A1 | 10/2004 | Iwashiro |
| 2010/0035085 A1 | 2/2010 | Jung et al. |
| 2010/0284546 A1 | 11/2010 | DeBrunner et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

B. Widrow, et al., "On Adaptive Inverse Control," Record of the Fifteenth Asilomar Conference on Circuits, Systems and Computers, pp. 185-189, Nov. 1981.

Chi, Hsiang-Feng, et al., "Band-limited feedback cancellation with a modified filtered-X LMS algorithm for hearing aids," Speech Communication, Jan. 2003, vol. 39, No. 1-2, pp. 147-161.

U.S. Appl. No. 13/458,863, filed Apr. 27, 2012, 23 pages.

U.S. Appl. No. 13/668,142, filed Nov. 2, 2012, 14 pages.

Non-Final Office Action dated May 12, 2014 from U.S. Appl. No. 13/668,142, 14 pages.

Notice of Allowance dated Aug. 21, 2014 from U.S. Appl. No. 13/668,142, 43 pages.

* cited by examiner

DISK DRIVE OPTIMIZING FILTERS BASED ON SENSOR SIGNAL AND DISTURBANCE SIGNAL FOR ADAPTIVE FEED-FORWARD COMPENSATION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the actuator arm as it seeks from track to track.

FIG. 1 shows a prior art disk format 2 comprising a number of servo tracks 4 defined by concentric servo sectors $6_0$-$6_N$ recorded around the circumference of each servo track, wherein data tracks are defined relative to the servo tracks 4. Each servo sector 6, comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. A dynamic fly height (DFH) servo controller may measure the fly height of the head and adjust the fly height actuator to maintain a target fly height during write/read operations.

Certain conditions may affect the ability of the VCM servo controller to maintain the head along the centerline of a target data track and/or the ability of the DFH servo controller to maintain the target fly height. For example, an external vibration applied to the disk drive or degradation and/or malfunction of the spindle motor that rotates the disks may induce a disturbance in the servo control systems. The degradation caused by such a disturbance may be ameliorated using a feed-forward compensation algorithm.

DETAILED DESCRIPTION

Figure 1:
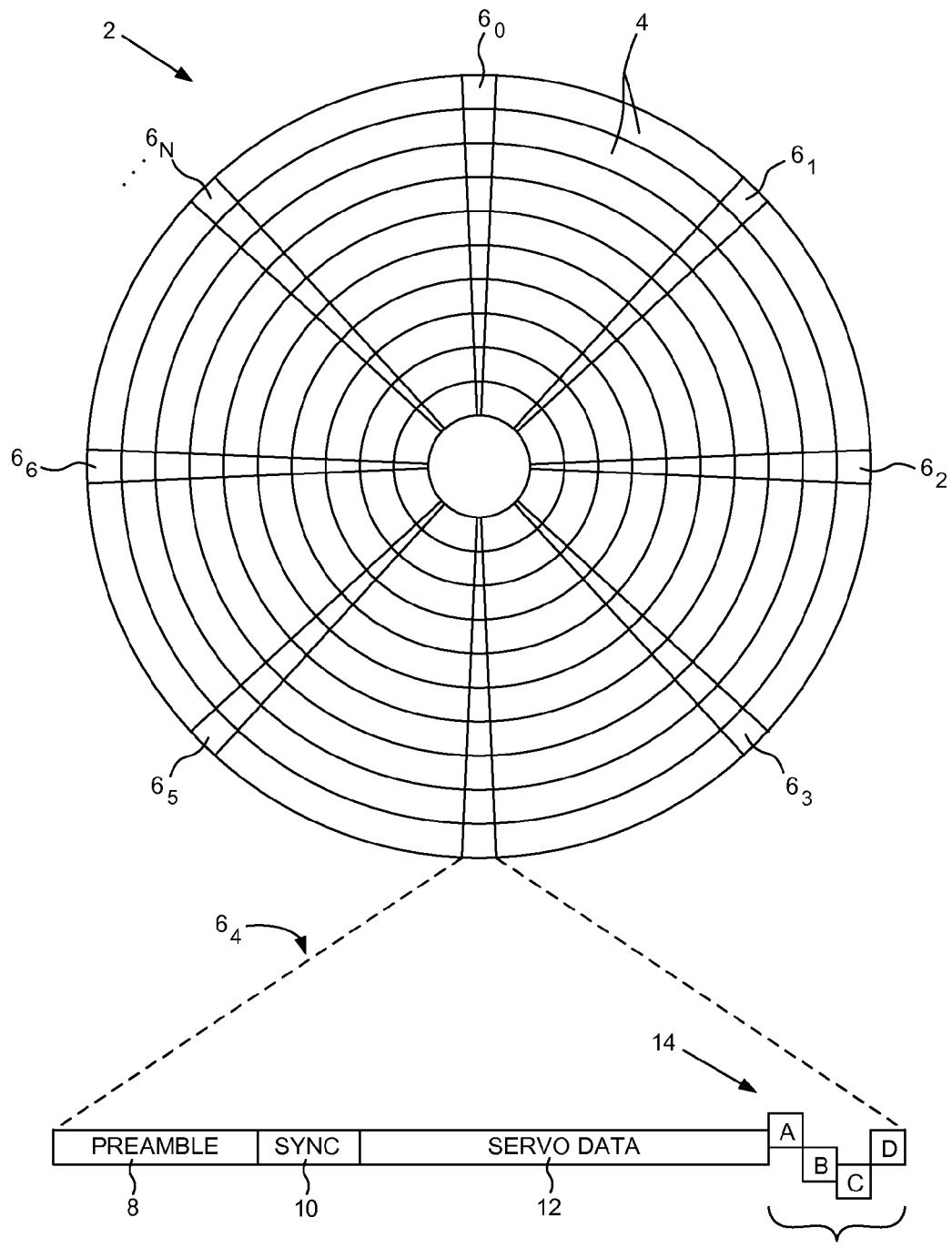
FIG. 1 shows a prior art disk format comprising a plurality of servo tracks defined by servo sectors.
Figure 2:
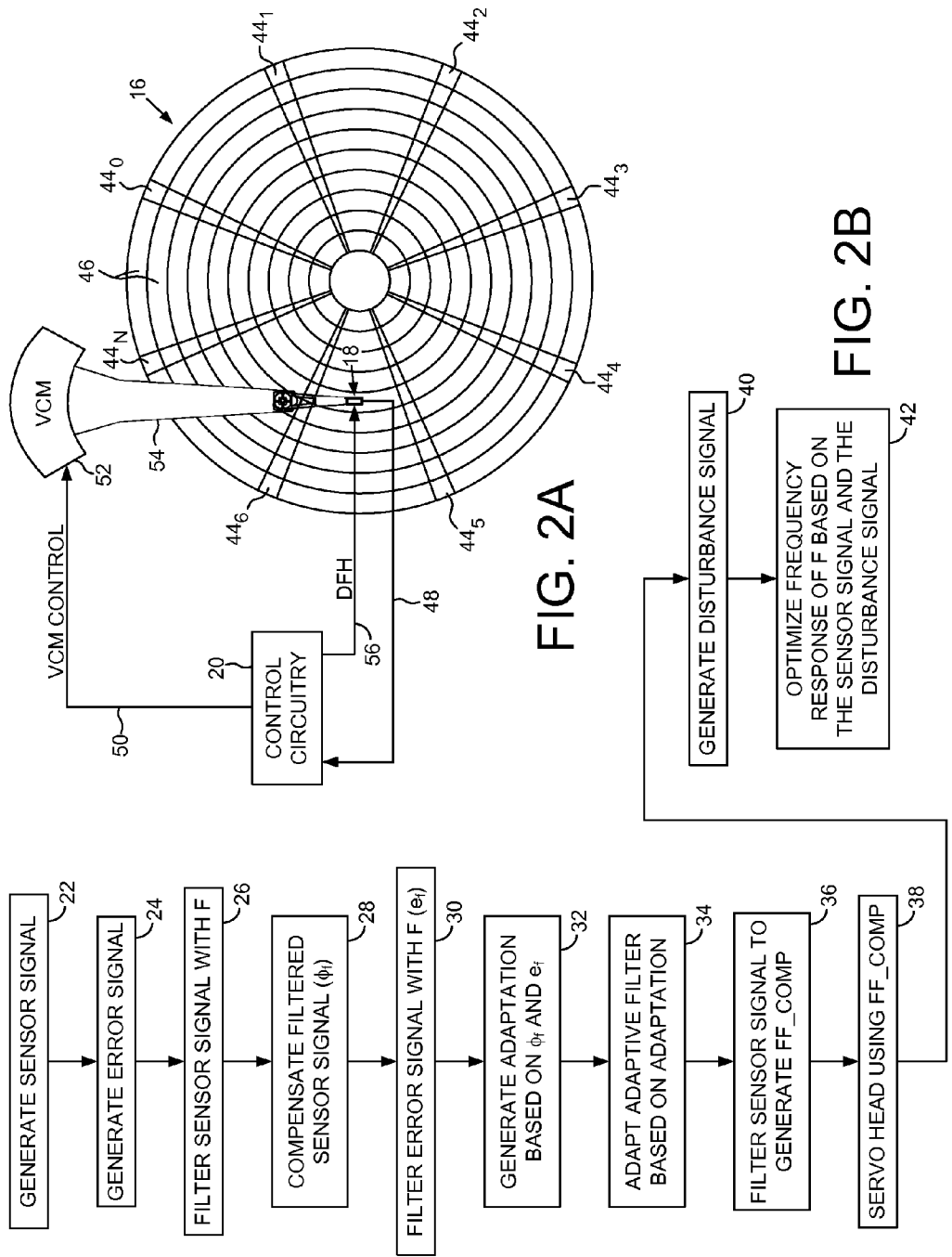
FIG. 2A shows a disk drive according to an embodiment comprising a head actuated radially and vertically over a disk.
FIG. 2B is a flow diagram according to an embodiment wherein filters are optimized based on a sensor signal and a disturbance signal for adaptive feed-forward compensation of a servo control system.

FIG. 2A shows a disk drive according to an embodiment comprising a disk 16, a head 18, and control circuitry 20 comprising a servo control system (FIG. 3) operable to actuate the head 18 over the disk 16. The control circuitry 20 is operable to execute the flow diagram of FIG. 2B, wherein a sensor signal 23 is generated in response to a disturbance (block 22), and an error signal 25 of the servo control system is generated (block 24). The sensor signal 23 is filtered with a first filter 27A comprising a frequency response to generate a filtered sensor signal 29 (block 26), and the filtered sensor signal 29 is filtered 31 to generate a compensated sensor signal 33 (block 28). The error signal 25 is filtered with a second filter 27B comprising the frequency response to generate a filtered error signal 35 (block 30). An adaptation signal 37 is generated 39 based on the compensated sensor signal 33 and the filtered error signal 35 (block 32), and an adaptive filter 41 is adapted in response to the adaptation signal 37 (block 34), wherein the adaptive filter 41 filters the sensor signal 23 to generate feed-forward compensation values 43 (block 36), and the feed-forward compensation values 43 are applied to the servo control system to compensate for the disturbance (bock 38). A disturbance signal 45 is generated that represents the disturbance (block 40), and the frequency response of the first and second filters 27A and 27B is optimized 47 based on the sensor signal 23 and the disturbance signal 45 (block 42).

In the embodiment of FIG. 2A, the disk comprises a plurality of servo sectors $44_0$-$44_N$ that define a plurality of servo tracks 46, wherein data tracks are defined relative to the servo tracks 46 at the same or different radial density (tracks per inch). The control circuitry 20 processes a read signal 48 emanating from the head 18 to demodulate the servo sectors $44_0$-$44_N$ and generate a position error signal (PES) representing an error between the actual position of the head and a target position relative to a target track. The control circuitry 20 processes the PES using a suitable servo control system to generate a control signal 50 applied to a voice coil motor (VCM) 52 which rotates an actuator arm 54 about a pivot in order to actuate the head 18 radially over the disk 16 in a direction that reduces the PES. In one embodiment, the disk drive may also comprise a suitable microactuator, such as a suitable piezoelectric (PZT) element for actuating the head 18 relative to a suspension, or for actuating a suspension relative to the actuator arm 54. The servo sectors $44_0$-$44_N$ may comprise any suitable head position information, such as a track address for coarse positioning and servo bursts for fine positioning. The servo bursts may comprise any suitable pattern, such as an amplitude based servo pattern or a phase based servo pattern.

The disk drive of FIG. 2A may also comprise a suitable fly height actuator, such as a suitable heater or PZT element integrated with the head 18, for actuating the head 18 vertically over the disk 16 in order to maintain a target fly height. The control circuitry 20 may process the read signal 48 to measure a fly height of the head 18, or the head 18 may comprise a suitable fly height sensor, such as a suitable magnetoresistive (MR) element or capacitive element. The control circuitry 20 compares the measured fly height to a target fly height to generate a fly height error that is processed by a suitable servo control system to generate a dynamic fly height (DFH) control signal 56 applied to the fly height actuator.

Figure 3:
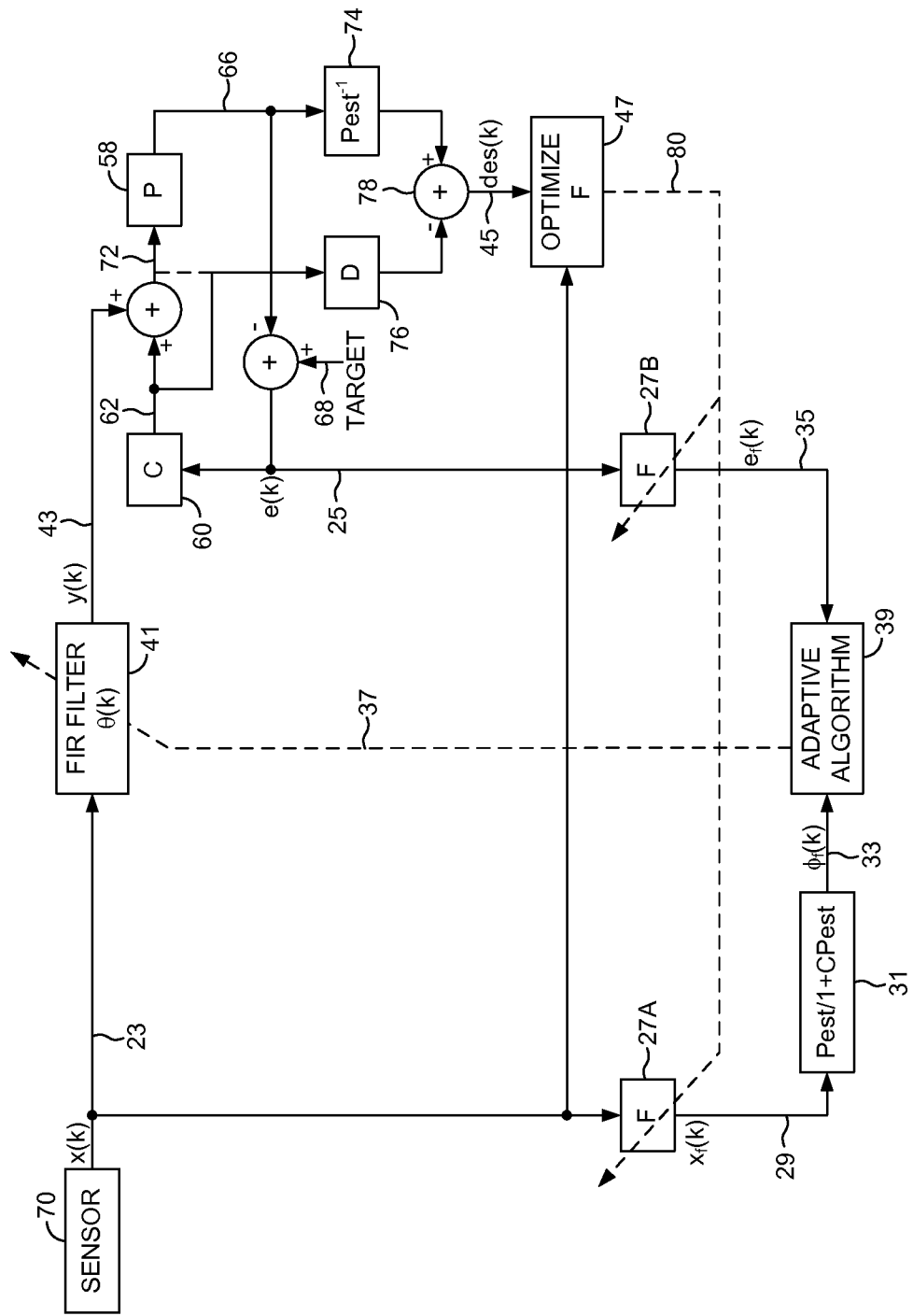
FIG. 3 shows a servo control system according to an embodiment comprising a first filter for filtering a sensor signal and a second filter for filtering an error signal, wherein a frequency response of the first and second filters is optimized based on the sensor signal and a disturbance signal.

FIG. 3 shows an example servo control system according to an embodiment for actuating the head 18 radially or vertically over the disk 16. The actuator in FIG. 3 (e.g., VCM, microactuator, or fly height actuator) is represented as a plant (P) 58, and a suitable compensator (C) 60 generates a feedback control signal 62 by filtering the error signal 25. The error signal 25 is generated based on the difference between a measured signal 66 (e.g., position of fly height) and a target signal 68, where the compensator (C) 60 adjusts the feedback control signal 62 so as to reduce the error signal 25.

The servo control system may be affected by a disturbance, such as an external vibration applied to the disk drive and/or malfunction of the spindle motor that rotates the disk 16. In one embodiment, a suitable electronic sensor 70 generates a sensor signal 23 in response to the disturbance, and feed-forward compensation values 43 are generated by filtering 41 the sensor signal 23. In the embodiment of FIG. 3, the feed-forward compensation values 43 adjust the feedback control signal 62 to generate a compensated control signal 72 applied to the plant 58 so as to compensate for the disturbance. Any suitable electronic sensor 70 may be employed in the embodiments of the present invention, such as a suitable accelerometer which detects a force (e.g., linear and/or rotational) applied to the disk drive that causes a corresponding vibration.

Figure 4:
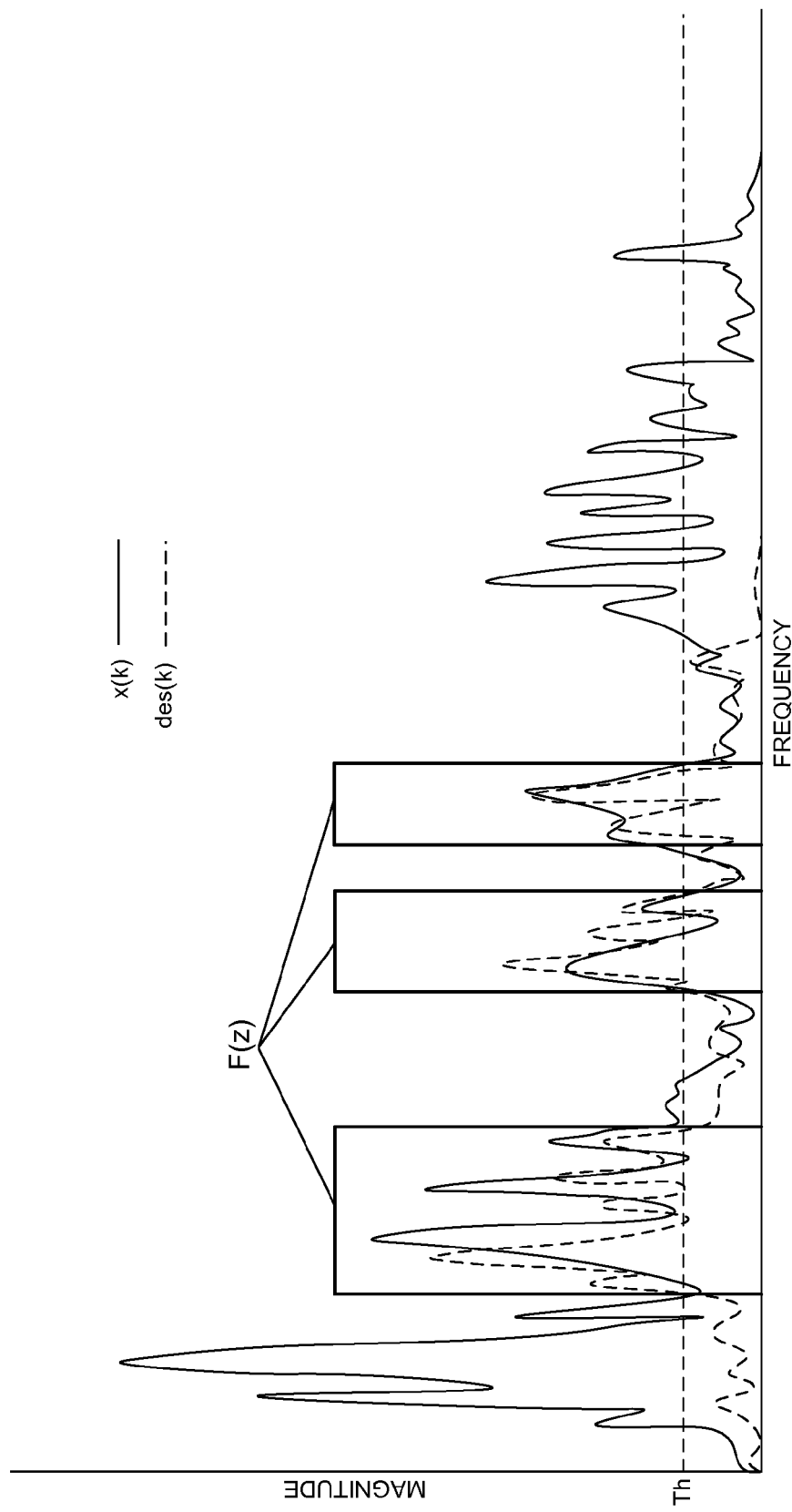
FIG. 4 shows an example of an optimized frequency response for the first and second filters.

In one embodiment, the sensor signal 23 generated by the electronic sensor 70 representing the disturbance to the disk drive may not accurately represent the actual disturbance to the servo system in FIG. 3 over all frequency ranges. Accordingly, in one embodiment the purpose of the first and second filters 27A and 27B is to extract the frequency components of the sensor signal 23 that correlate with a corresponding disturbance signal 45 that represents the effect of the disturbance on the servo control system. This embodiment is illustrated in FIG. 4 which shows the frequency response of the sensor signal 23 as a solid line and the frequency response of the disturbance signal 45 as a dashed line. As shown in FIG. 4, in one embodiment the frequency response F(z) of the first and second filters 27A and 27B comprise a plurality of bandpass components corresponding to when the correlation between the two signals is high (e.g., greater than a threshold). Also in the embodiment of FIG. 4, the frequency response F(z) comprises a bandpass component when the corresponding disturbance signal 45 is greater than a threshold Th. That is, the frequency response F(z) of the first and second filters 27A and 27B corresponds to frequency ranges where there is a high correlation between the sensor signal 23 and the disturbance signal 45, as well as a significant amplitude response in the disturbance signal 45.

The disturbance signal 45 that represents the disturbance affecting the servo control system of FIG. 3 may be generated in any suitable manner. In one embodiment, the disturbance signal 45 may be generated as the error signal 25, in which case the sensor signal 23 would be filtered with a torque rejection curve (similar to block 31) before correlating with the error signal 25. In the embodiment of FIG. 3, a more accurate representation of the disturbance is generated by subtracting the effect that the feedback control signal 62 has on the plant 58. This is accomplished by filtering the output 66 of the plant 58 with an inverse estimate of the plant 74, and subtracting the delayed 76 feedback control signal 62 at adder 78 to generate the disturbance signal 45, where the delay 76 accounts for the transport delay of the plant 58. The disturbance signal 45 is correlated with the sensor signal 23 at block 47 to generate a signal 80 used to optimize the frequency response F(z) of the first and second filters 27A and 27B as described above with reference to FIG. 4.

In one embodiment, the feed-forward compensation values 43 may be disabled when optimizing the frequency response F(z), and in another embodiment the feed-forward compensation values 43 may be enabled so that the frequency response F(z) may be optimized using an iterative technique. For example, the frequency response F(z) may be initially optimized with the feed-forward compensation values 43 disabled. The feed-forward compensation values 43 may then be generated using the initial frequency response F(z) for the first and second filters 27A and 27B. If the residual correlation between the sensor signal 23 and resulting disturbance signal 45 is still high and the amplitude of the disturbance signal 45 still exceeds the threshold shown in FIG. 4, then the amplitude and/or phase of the corresponding bandpass component of the frequency response F(z) may be adjusted. This process may be repeated for a number of iterations until the amplitude of the disturbance signal 45 falls below the threshold in FIG. 4. In one embodiment, while adapting the frequency response F(z) with the feed-forward compensation values 43 enabled, the input to the delay block 76 may be taken from the input 72 of the plant 58 as represented by the dashed line in FIG. 3.

Any suitable adaptive algorithm 39 may be employed in FIG. 3 to adapt the adaptive filter 41 in response to the filtered sensor signal 29 and the filtered error signal 35. In one embodiment, the adaptive algorithm 39 implements a Filtered-X Least Mean Square (LMS) algorithm with attempts to minimize the following equation:

$$E(e_f(k)^2) = E[(F(z^{-1})e(k))^2].$$

Any suitable adaptive filter 41 may also be employed, wherein in one embodiment the adaptive filter 41 comprises a finite impulse response (FIR) filter having coefficients θ(k) wherein the control circuitry 20 is operable to adapt the adaptive filter 41 according to:

$$\theta(k+1) = \theta(k) + \mu(k)\phi_f(k)e_f(k)$$

where μ represents a learning coefficient, $\phi_f(k)$ represents the compensated sensor signal 33, and $e_f(k)$ represents the filtered error signal 35. In one embodiment, the learning coefficient μ is updated according to:

$$\mu(k) = \beta/(\epsilon + \phi_f(k)^T \phi_f(k))$$

if $\mu(k) > \mu_{max}, \mu(k) = \mu_{max}$; else if $\mu(k) < \mu_{min}, \mu(k) = \mu_{min}$ where β is a suitable scalar, and ε is a small positive number to avoid division by zero. With the filtered (weighted) error signal 35 and the adaptation regressor $\phi_f(k)$ 33, the modified Filtered-X LMS algorithm in the above-described embodiment may be considered a Filtered-X weighted-error normalized LMS (WE-NLMS) algorithm.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
    a disk;
    a head; and
    control circuitry comprising a servo control system operable to actuate the head over the disk, the control circuitry operable to:
        generate a sensor signal in response to a disturbance;
        generate an error signal of the servo control system;
        filter the sensor signal with a first filter comprising a frequency response to generate a filtered sensor signal;
        filter the filtered sensor signal to generate a compensated sensor signal;
        filter the error signal with a second filter comprising the frequency response to generate a filtered error signal;
        generate an adaptation control signal based on the compensated sensor signal and the filtered error signal;
        adapt an adaptive filter in response to the adaptation control signal, wherein the adaptive filter filters the sensor signal to generate feed-forward compensation values;
        apply the feed-forward compensation values to the servo control system to compensate for the disturbance;
        generate a disturbance signal that represents the disturbance; and
        optimize the frequency response of the first and second filters based on the sensor signal and the disturbance signal.

2. The disk drive as recited in claim 1, wherein the servo control system actuates the head radially over the disk.

3. The disk drive as recited in claim 2, wherein the error signal represents a difference between a measured radial location and a reference radial location.

4. The disk drive as recited in claim 1, wherein the control circuitry is operable to optimize the frequency response of the first and second filters based on a correlation of the sensor signal with the disturbance signal.

5. The disk drive as recited in claim 4, wherein the frequency response comprises at least one bandpass component corresponding to when the correlation is greater than a threshold.

6. The disk drive as recited in claim 5, wherein the frequency response comprises the bandpass component when the corresponding disturbance signal is greater than a threshold.

7. The disk drive as recited in claim 1, wherein the servo control system comprises a compensator and an actuator.

8. The disk drive as recited in claim 7, wherein the control circuitry is operable to apply the feed-forward compensation values to an output of the compensator.

9. The disk drive as recited in claim 7, wherein the control circuitry is operable to generate the disturbance signal based on a difference between an input to the actuator and an output of the actuator.

10. The disk drive as recited in claim 9, wherein the control circuitry is operable to optimize the frequency response of the first and second filters based on a correlation of the sensor signal with the disturbance signal.

11. The disk drive as recited in claim 10, wherein the frequency response comprises at least one bandpass component corresponding to when the correlation is greater than a threshold.

12. The disk drive as recited in claim 11, wherein the frequency response comprises the bandpass component when the corresponding disturbance signal is greater than a threshold.

13. The disk drive as recited in claim 1, wherein the control circuitry is operable to adapt the adaptive filter according to:

$$\theta(k+1)=\theta(k)+\mu(k)\phi_f(k)e_f(k)$$

where:
    $\theta$ represents coefficients of the adaptive filter;
    $\mu$ represents a learning coefficient;
    $\phi_f(k)$ represents the compensated sensor signal; and
    $e_f(k)$ represents the filtered error signal.

14. A method of operating a disk drive comprising a disk, a head, and control circuitry comprising a servo control system operable to actuate the head over the disk, the method comprising:
    generating a sensor signal in response to a disturbance;
    generating an error signal of the servo control system;
    filtering the sensor signal with a first filter comprising a frequency response to generate a filtered sensor signal;
    filtering the filtered sensor signal to generate a compensated sensor signal;
    filtering the error signal with a second filter comprising the frequency response to generate a filtered error signal;

generating an adaptation control signal based on the compensated sensor signal and the filtered error signal;

adapting an adaptive filter in response to the adaptation control signal, wherein the adaptive filter filters the sensor signal to generate feed-forward compensation values;

applying the feed-forward compensation values to the servo control system to compensate for the disturbance;

generating a disturbance signal that represents the disturbance; and optimizing the frequency response of the first and second filters based on the sensor signal and the disturbance signal.

15. The method as recited in claim 14, wherein the servo control system actuates the head radially over the disk.

16. The method as recited in claim 15, wherein the error signal represents a difference between a measured radial location and a reference radial location.

17. The method as recited in claim 14, further comprising optimizing the frequency response of the first and second filters based on a correlation of the sensor signal with the disturbance signal.

18. The method as recited in claim 17, wherein the frequency response comprises at least one bandpass component corresponding to when the correlation is greater than a threshold.

19. The method as recited in claim 18, wherein the frequency response comprises the bandpass component when the corresponding disturbance signal is greater than a threshold.

20. The method as recited in claim 14, wherein the servo control system comprises a compensator and an actuator.

21. The method as recited in claim 20, further comprising applying the feed-forward compensation values to an output of the compensator.

22. The method as recited in claim 20, further comprising generating the disturbance signal based on a difference between an input to the actuator and an output of the actuator.

23. The method as recited in claim 22, further comprising optimizing the frequency response of the first and second filters based on a correlation of the sensor signal with the disturbance signal.

24. The method as recited in claim 23, wherein the frequency response comprises at least one bandpass component corresponding to when the correlation is greater than a threshold.

25. The method as recited in claim 24, wherein the frequency response comprises the bandpass component when the corresponding disturbance signal is greater than a threshold.

26. The method as recited in claim 14, further comprising adapting the adaptive filter according to:

$$\theta(k+1)=\theta(k)+\mu(k)\phi_f(k)e_f(k)$$

where:
$\theta$ represents coefficients of the adaptive filter;
$\mu$ represents a learning coefficient;
$\phi_f(k)$ represents the compensated sensor signal; and
$e_f(k)$ represents the filtered error signal.

* * * * *